Patented Sept. 5, 1944

2,357,298

UNITED STATES PATENT OFFICE 2,357,298

PREPARATION OF DIALKYL PEROXIDES

Richard Haven Wiley, Wilmington, Del., assignor to E. I. du Pont de Nemours & Company, Wilmington, Del., a corporation of Delaware No Drawing. Application September 25, 1942, Serial No. 459,717

5 Claims. (Cl. 260—610)

This invention relates to a process for the preparation of dialkyl peroxides and more particularly to the preparation of dialkyl peroxides from the hydrogen peroxide and dialkyl sulfates.

The dialkyl peroxides such as dimethyl peroxide, ethyl methyl peroxide, and diethyl peroxide have been known for some time and methods of their preparation have been described in the scientific literature. More recently dipropyl peroxide has been prepared and described. Baeyer and Villiger, Ber. 33, 3387 (1900) suggest the addition of aqueous potassium hydroxide to a mixture of hydrogen peroxide and diethyl sulfate at temperatures of 15 to 20° C. The reaction as they carried it out was considered an alkylation of the hydrogen peroxide molecule to give diethyl peroxide. The mixture of alkali and dialkyl sulfate is the alkylating reagent. This same method has been used by numerous other workers. All consider the reaction one of alkylation and as a result studiously avoid high temperatures which are known to cause such undesirable results as: (1) decomposition of the hydrogen peroxide (2) combination of undecomposed diethyl sulfate with the aqueous alkali to give diethyl ether (3) decomposition of the whole reaction mixture with explosive violence. As illustrative of the unsatisfactory nature of the available methods for synthesizing dialkyl peroxides Harris in Proc. Roy. Soc. A173, 126 (1939): obtained a yield of less than 1% of dipropyl peroxide while Reiche and Hitz Ber. 62, 221 (1929) obtained less than 4% of diethyl peroxide.

An object of invention is to provide a satisfactory method for the preparation of dialkyl peroxides in good yields and by a process which can be operated quickly.

A further object is to provide non-hazardous reaction conditions for the reaction. Other objects and advantages of the invention will hereinafter appear.

In accord with the invention dialkyl peroxides are obtained in high yields from dialkyl sulfates, hydrogen peroxide, and aqueous alkalies at temperatures above 25° C. and ranging between 30 and 100° C., the reaction being preferably blanketed by nitrogen or other suitable inert gases such as helium, argon, and neon.

The following example describes a preferred embodiment of the invention in which parts are by weight unless otherwise indicated.

Example

A 3-necked reactor is provided with a stirrer, an adding funnel, and a side arm connected to a condenser. The reactor is so equipped as to be blanketed by nitrogen during the operation. In addition an outlet is led to the drain from a valve connection at the bottom of the reactor. The reactor is placed in a bath which can be heated to the desired temperature. The condenser is attached to the side arm to condense the product which is formed during the operation and distilled out through the side arm. A solution of 11.2 parts by weight of potassium hydroxide in 25 parts by weight of water is added to the reactor along with 30.8 parts by weight of diethyl sulfate. The reactor is held at a temperature of 60 to 70° C. and the stirrer is operated vigorously while 11.3 parts by weight of 30% aqueous hydrogen peroxide are added rapidly to the mixture. During the addition or shortly thereafter, a vigorous reaction will set in and the product, diethyl peroxide, will distill from the reactor and will collect in the receiver. After the reaction has subsided and no more material distills out of the reactor while the bath is at 75° C. or higher the residual materials are led down the drain by opening the drain outlet tube in the bottom of the reactor and the process is repeated. When five runs have been made the two layers of crude material which have collected in the receiver are spearated. The upper layer which is nearly pure diethyl peroxide consists of 28.7 parts by weight, corresponding to a yield of 64%. After drying with a suitable drying agent the crude material is distilled and a fraction boiling 61 to 65° C. having a refractive index of $N_D^{23}$ 1.3700 is separated. As much as 90% of the crude material boils between 61 and 65° C. By using this procedure 200 parts by weight of crude diethyl peroxide can be prepared in as short a time as 4 to 6 hours. If the reaction does not take place when all of the hydrogen peroxide has been added the temperature of the bath is raised to 70-75° or slightly higher and held there until the reaction occurs. The reactants for the next run are added cold so that the temperature of the bath drops below the reaction temperature. Due to the explosive nature of these compounds, all operations should be carried out behind a barricade and under a blanket of nitrogen.

Other aqueous alkaline mixtures may be used. As for example other hydroxides of the alkali metals and alkaline earth metals. The concentration of the alkali in water need not necessarily be that disclosed in the example but may be present in amounts ranging between 2% and 90% (of the total reaction mixture). It is important that the aqueous alkali be of such concentration as to react with the dialkyl sulfate used in the process. It is not necessary that an alkali metal or alkanline earth metal hyroxide be used, for other alkaline salts such as the carbonates may be used. Other concentrations of 3% to 80% of aqueous hydrogen peroxide (based on the total weight of reactants) may be used with the preferred concentrations between 10 and 40% (on the same basis).

The dialkyl sulfate to be used in the reaction is that corresponding to the desired dialkyl peroxide. Either dimethyl or diethyl sulfate, which are both commercially available, may be used or dipropyl sulfate or diisopropyl sulfate prepared by the method of Medvedev and Alexseeva, Ber. 65, 131 (1932) may be used. Other higher molecular weight dialkyl disulfates can be used, subject only to the limitations imposed by the variations in the procedure as outlined in the following discussion.

The procedure described in carrying out the process is one which involves a batch type of operation, although the process may be made continuous, i. e. the reactants may be led continuously into a reaction mixture where they are thoroughly mixed while heated to the desired temperature; followed by a continuous removal of the product by distillation or filtration and the continuous withdrawal of products by decantation or other convenient means.

The reaction procedure requires that all reactants be brought in contact at an elevated temperature. This temperature will vary and will be determined by the rate of reaction of the particular reactants involved. Since, however, both the hydrogen peroxide and the mixture of aqueous alkali and dialkyl sulfate are themselves decomposed by heat, it will not be possible to operate at temperatures in excess of that at which these side reactions predominate. At the same time, it is necessary that the reaction proceed rapidly. It has been found in the operation of this invention that the proper temperature is approximately the temperature at which the dialkyl sulfate reacts with the alkali to form a dialkyl ether. If the hydrogen peroxide is added to the reaction mixture and is present when the temperature reaches the temperature at which the dialkyl ether would be formed in its absence, the dialkyl peroxide will be formed. This temperature will lie between 30 and 100° C., or preferably between 55 and 75° C. The choice of various alkaline reagents or dialkyl sulfates which may be used in the exercise of this invention will require the judicious selection within the broad temperature range of the proper temperature since not all of the combinations of alkali and dialkyl sulfate will react with facility at the same temperature.

The hydrogen peroxide solution may be added to the mixture of alkali and diethyl sulfate as they are decomposing or it may be added entirely before the reaction has begun. The mixture of the aqueous potassium hydroxide or other aqueous alkali solution and hydrogen peroxide which has been kept cold to prevent decomposition can be added to the diethyl sulfate at the reaction temperature. Other combinations and procedures in adding the reactants may be followed which in effect introduce all the reactants in an undecomposed state into the reaction chamber where the three may mutually react at the specified temperature.

Variations in the procedure which may result from the operation of the invention with dialkyl sulfates of shorter or longer carbon chains may be made without departing from the spirit of the invention. Thus, it may not be feasible to distill the product from the reaction mixture because of its high boiling point. In this case procedures such as the following may be adopted in order to obtain the desired dialkyl peroxide. After the reaction has proceeded to completion, the dialkyl peroxide may be steam distilled from the reaction mixture, or since the dialkyl peroxides as a class are insoluble in water, the product may be separated from the aqueous layer after the reaction has finished and may then be subjected to fractionation. This fractionation may be carried out at reduced pressures. The dialkyl peroxide, if of sufficiently high molecular weight to be a solid, may be separated from the reaction by solidification through cooling followed by filtration, drying, and recrystallization.

It is highly desirable that all steps in the operation of this invention be carried out behind a barricade due to the extremely reactive nature of the products produced by this reaction. For the same reason it is desirable that the reaction mixture be blanketed with nitrogen during the operation. The type of stirring adopted for the successful operation of the invention must be such as to obtain an intimate mixture of the three reactants, the dialkyl sulfate, the hydrogen peroxide, and the aqueous alkali. It is necessary that the stirring be efficient in order that the liquids which are not mutually soluble can be brought into sufficiently intimate contact to allow the reaction to proceed.

The term dialkyl peroxide is used with reference to a peroxide of a type that could be called a dioxide because of its theoretically linear structure. Thus dipropyl peroxide is thought to have a linear structure such as:

$$CH_3CH_2CH_2-O-O-CH_2CH_2CH_3$$

This is pointed out in order to avoid confusion of the products of the herein described invention with the "peroxides" mentioned in the literature which are of unknown composition or structure, but are suggested as the cause of the explosive properties of certain organic chemicals or residues.

The products prepared by the processes of the invention are of value as explosives and detonating agents by virtue of their inherent instability. The dialkyl peroxides are catalysts for various vinyl type polymerizations and are of particular interest in this respect because they are subject to being used under varying conditions not practical with other types of peroxides. For this reason new types of vinyl compounds hitherto not polymerized have been polymerized and also vinyl compounds which have been known to polymerize with other types of catalysts have been found to yield more attractive products when polymerized with dialkyl peroxide catalysts.

I claim:

1. A process for the preparation of diethyl peroxide which comprises heating a reaction mixture of the approximate composition 11.2 parts of potassium hydroxide, 25 parts of water and 30.8 parts of diethyl sulfate to a temperature between 60 and 75° C., adding 11.3 parts of 30% aqueous hydrogen peroxide with efficient stirring, withdrawing the diethyl peroxide by distillation as formed, while maintaining throughout the reaction a blanket of nitrogen over the reactants, and subsequently recovering the diethyl peroxide from the condenate.

2. A process for the preparation of a dialkyl peroxide selected from the group consisting of dimethyl, diethyl and dipropyl peroxides, which comprises intimately mixing hydrogen peroxide with an aqueous alkaline solution and a dialkyl sulfate selected from the group consisting of dimethyl, diethyl and dipropyl sulfates at a temperature between 30 and 100° C. and simultaneously distilling off the dialkyl peroxide substantially as rapidly as formed.

3. A process for the preparation of dimethyl peroxide which comprises adding with intimate mixing an aqueous hydrogen peroxide to an aqueous alkaline solution and dimethyl sulfate at a temperature between 55 and 75° C. and simultaneously distilling off the dimethyl peroxide substantially as rapidly as formed.

4. A process for the preparation of diethyl peroxide which comprises adding with intimate mixing an aqueous hydrogen peroxide to an aqueous alkaline solution and diethyl sulfate at a temperature between 55 and 75° C., and simultaneously distilling off the diethyl peroxide substantially as rapidly as formed.

5. A process for the preparation of dipropyl peroxide which comprises adding with intimate mixing an aqueous hydrogen peroxide to an aqueous alkaline solution and dipropyl sulfate at a temperature between 55 and 75° C., and simultaneously distilling off the dipropyl peroxide substantially as rapidly as formed.

RICHARD HAVEN WILEY.